United States Patent
Hofer et al.

(10) Patent No.: US 12,212,163 B2
(45) Date of Patent: Jan. 28, 2025

(54) BATTERY SYSTEM

(71) Applicant: Samsung SDI Co., Ltd., Yongin-si (KR)

(72) Inventors: Maximilian Hofer, Hartberg (AT);
Nikolaus Hochgatterer, Graz (AT);
Dolores Kim, Yongin-si (KR);
Myungchul Kim, Yongin-si (KR);
Sunmin Kim, Yongin-si (KR);
Pyungkap Kim, Yongin-si (KR);
Byeongseon Min, Yongin-si (KR);
Sangchul Seo, Yongin-si (KR);
Jeongmo Yang, Yongin-si (KR);
Kwangmin Yoo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 624 days.

(21) Appl. No.: 16/852,923

(22) Filed: Apr. 20, 2020

(65) Prior Publication Data

US 2021/0028632 A1   Jan. 28, 2021

(30) Foreign Application Priority Data

Jul. 25, 2019   (EP) .................................... 19188387
Apr. 2, 2020    (KR) ........................ 10-2020-0040459

(51) Int. Cl.
*H02J 7/00*   (2006.01)

(52) U.S. Cl.
CPC ........ *H02J 7/00036* (2020.01); *H02J 7/0013* (2013.01); *H02J 7/0047* (2013.01); *H02J 7/00304* (2020.01); *H02J 2207/20* (2020.01)

(58) Field of Classification Search
CPC ................................................. H02J 2207/20
See application file for complete search history.

(56) References Cited

U.S. PATENT DOCUMENTS 5,958,021 A  *  9/1999  Tsuchiyama ........ G06F 13/4072
                                                                 326/38
7,745,025 B2 *  6/2010  Leach ................. H02J 7/00308
                                                                 320/140

(Continued)

FOREIGN PATENT DOCUMENTS

CN        105656122 B      1/2019
EP        2782201 A1 *     9/2014 .......... H01M 10/425

(Continued)

OTHER PUBLICATIONS

EPO Office Action dated Sep. 14, 2020, issued in corresponding European Patent Application No. 19188387.5 (4 pages).

(Continued)

*Primary Examiner* — Drew A Dunn
*Assistant Examiner* — Tynese V McDaniel
(74) *Attorney, Agent, or Firm* — Lewis Roca Rothgerber Christie LLP

(57) ABSTRACT

In a control unit for a battery system, the control unit includes: an input node configured to receive a sensor signal indicating a state of at least one of a plurality of battery cells of the battery system; a first microcontroller configured to generate a first control signal based on the state of the at least one battery cell; a first communication interface configured to receive a second state signal indicating an operation state of a second microcontroller; and a switch control circuit configured to: receive the first control signal; generate a second control signal based on the state of the at least one battery cell; and transmit one of the first and second control signal to a power switch of the battery system based on at least one received state signal indicating an operation state of the first microcontroller and of an operation state of the second microcontroller.

15 Claims, 7 Drawing Sheets

(56) References Cited

U.S. PATENT DOCUMENTS

| | | | | |
|---|---|---|---|---|
| 8,865,328 | B2* | 10/2014 | Kim | .................... H01M 10/425 |
| | | | | 320/135 |
| 9,680,333 | B1 | 6/2017 | Brooks et al. | |
| 10,389,144 | B2* | 8/2019 | Jin | ....................... H02J 7/0031 |
| 11,021,073 | B1* | 6/2021 | Gauthier | ................ H02M 3/00 |
| 2002/0047429 | A1* | 4/2002 | Kadoya | .............. B60L 15/2009 |
| | | | | 903/917 |
| 2009/0208821 | A1 | 8/2009 | Kosugi et al. | |
| 2012/0016547 | A1* | 1/2012 | Aridome | ................ B60L 58/14 |
| | | | | 180/65.265 |
| 2012/0212176 | A1* | 8/2012 | Park | ...................... H02J 7/0031 |
| | | | | 320/107 |
| 2012/0319654 | A1 | 12/2012 | Li | |
| 2014/0167669 | A1* | 6/2014 | Lim | ..................... B60L 3/0061 |
| | | | | 324/750.02 |
| 2014/0354236 | A1* | 12/2014 | Kim | ..................... H02J 7/0016 |
| | | | | 320/134 |
| 2015/0069832 | A1* | 3/2015 | Yamane | ............... H02M 3/155 |
| | | | | 307/10.1 |
| 2015/0097501 | A1* | 4/2015 | Yamane | .................... B60L 1/00 |
| | | | | 318/400.3 |
| 2015/0288201 | A1* | 10/2015 | Hatakeyama | ........... B60L 53/65 |
| | | | | 320/107 |
| 2016/0204647 | A1* | 7/2016 | Tsurumaru | ............ H02J 7/0068 |
| | | | | 320/107 |
| 2016/0301311 | A1* | 10/2016 | Tt | ....................... H02M 3/1584 |
| 2017/0126035 | A1 | 5/2017 | Tosch et al. | |
| 2017/0264229 | A1* | 9/2017 | Murata | ..................... H02P 3/22 |
| 2018/0009317 | A1* | 1/2018 | Chung | ..................... B60L 53/24 |
| 2018/0115024 | A1* | 4/2018 | Sugeno | ............... H01M 4/5825 |
| 2018/0186244 | A1* | 7/2018 | Harvey | .................... B60L 53/62 |
| 2018/0290605 | A1* | 10/2018 | Ito | ......................... B60L 15/007 |
| 2018/0337550 | A1 | 11/2018 | Agrelo et al. | |
| 2018/0354436 | A1* | 12/2018 | Sato | ......................... H02H 7/18 |
| 2019/0210473 | A1* | 7/2019 | Linehan | .................... B60L 1/00 |
| 2020/0395775 | A1* | 12/2020 | Hayayama | .......... H02J 7/00712 |
| 2021/0028632 | A1* | 1/2021 | Hofer | ..................... H02J 7/0047 |
| 2022/0219543 | A1* | 7/2022 | Takizawa | ................ B60L 58/22 |

FOREIGN PATENT DOCUMENTS

| | | |
|---|---|---|
| JP | WO2013/073269 A1 | 5/2013 |
| KR | 10-2017-0078201 A | 7/2017 |
| WO | WO 2017/079041 A1 | 5/2017 |

OTHER PUBLICATIONS

European Office action issued in corresponding application No. EP 19188387.5, dated Apr. 14, 2021, 6 pages.

Extended European Search Report of corresponding application 19188387.5, Nov. 6, 2019, 9 pages.

Korean Office Action dated Mar. 30, 2023, issued in corresponding Korean Patent Application No. 10-2020-0040459 (7 pages).

* cited by examiner

BATTERY SYSTEM

CROSS-REFERENCE TO RELATED APPLICATION

The present application claims priority to and the benefit of European Patent Application No. 19188387.5 filed in the European Patent Office on Jul. 25, 2019, and Korean Patent Application No. 10-2020-0040459, filed in the Korean Intellectual Property Office, on Apr. 2, 2020, the entire contents of both of which are incorporated herein by reference.

BACKGROUND

1. Field

Aspects of some example embodiments of the present invention relate to a battery system.

2. Background

A rechargeable or secondary battery differs from a primary battery in that a rechargeable battery can be repeatedly charged and discharged, while a primary battery generally provides only an irreversible conversion of chemical to electrical energy (i.e., cannot generally be repeatedly charged/discharged). Low-capacity rechargeable batteries may be used, for example, as a power supply for small electronic devices, such as cellular phones, notebook computers, and camcorders, while high-capacity rechargeable batteries may be used, for example, as the power supply for hybrid vehicles and the like.

The above information disclosed in this Background section is only for enhancement of understanding of the background and therefore the information discussed in this Background section does not necessarily constitute prior art.

SUMMARY

Aspects of some example embodiments of the present invention relate to a battery system and, for example, a battery system with relatively improved redundancy for fulfilling high safety standards. According to some example embodiments, the battery system comprises a control unit configured to control at least a power switch (shut-off relay) of the battery system and having a first microcontroller and a DC/DC converter (i.e., an electronic circuit configured to convert a source of direct current (DC) from one voltage level to another voltage level) having a second microcontroller. According to some example embodiments, the control unit can redundantly control the DC/DC converter, while still fulfilling its own task. Aspects of some example embodiments of the present invention further relate to a control unit and a DC/DC converter for such a battery system.

Aspects of some example embodiments according to the present disclosure include a control unit, a battery system, and a DC/DC converter according to the respective appended claims, and their equivalents.

Aspects of some example embodiments of the present disclosure include a control unit for a battery system, wherein the control unit comprises at least one input node that is configured for receiving at least one sensor signal, which is indicative of a state of at least one of a plurality of battery cells of the battery system. According to some example embodiments, the control unit may be configured for monitoring the state of the battery system by monitoring at least some of its battery cells. The sensor(s) supplying the sensor signal(s) may be either part of the control unit or the battery system. The input node may be configured for single-ended or differential input. According to some example embodiments, the sensor signal is a voltage signal and/or a current signal of at least one of the battery cells of the battery system.

According to some example embodiments, the control unit further comprises a first microcontroller that is configured to generate a first control signal based on the state of the at least one battery cell. According to some example embodiments, the first microcontroller may be connected to the at least one input node and may be configured for generating a first control signal based on the sensor signal. The first control signal may be suitable for controlling a power switch (e.g., a relay) of the battery system in which the control unit is utilized. According to some example embodiments, the first control signal is suitable for setting the power switch either conductive or non-conductive, for example, by taking one of two values. The first microcontroller may be configured to control the protection system of the battery system, for example, an overcurrent protection. The sensor signal may be a current signal.

According to some example embodiments, the first microcontroller may be configured to perform at least one control function with respect to the battery system. According to some example embodiments, the at least one control function may include measurements of cell voltages, cell currents, cell resistances or cell capacities. According to some example embodiments, the control functions also comprise the active or passive balancing of cell voltages or cell currents of a plurality of battery cells. The control unit may further include a mechanism for detecting a voltage of at least one battery cell, and/or a mechanism for balancing the voltages of a plurality of battery cells. According to some example embodiments, the first microcontroller is configured as one of a battery management system, BMS, battery system manager, BSM, or cell supervision circuit, CSC as described above. According to some example embodiments, the control functions further relate to data communication with the CSCs of battery cells or battery submodules of the battery system and/or with connected electric consumers.

According to some example embodiments, the first microcontroller of the invention further comprises a first communication interface that is configured to receive a second state signal. The first communication interface may be a data input pin of the first microcontroller. According to some example embodiments, a data line as described in more detail below is connected to the first communication interface for providing the second state signal. The second state signal that can be received via the first communication interface is indicative of an operation state of a second microcontroller. In other words, the first microcontroller may be configured to receive a second state signal indicative of whether a second microcontroller, for example, a second microcontroller of a DC/DC converter, is operating normally or is in a fault state. The first microcontroller may also be configured to process the signal.

According to some example embodiments, the control unit of the present invention further comprises a switch control circuit that is configured for controlling the power switch of the battery system. Therefore, the control unit may be configured for transmitting at least one switch control signal to the power switch. The switch control signal may be suitable for setting the power switch to be either conductive or non-conductive or, alternatively, for freely setting the conductivity of the power switch.

According to some example embodiments, the switch control circuit may be further configured for receiving the first control signal directly or indirectly from the first microcontroller. The switch control circuit may further be configured to receive a signal indicative of the state of the at least one battery cell, for example, the sensor signal received from the input node as described above. The switch control circuit may further be configured to receive at least one state signal, for example, a first state signal, a second state signal and/or a combined state signal, which is/are indicative of an operation state of the first microcontroller and/or of an operation state of the second microcontroller. The switch control circuit operates based on these input signals as described in more detail in the following.

According to some example embodiments, the switch control circuit is configured to generate a second control signal based on the signal indicative of the state of the at least one battery cell, for example, based on the sensor signal received from the input node. Therein, the second control signal is suitable for controlling the power switch, for example, a relay, of the battery system in which the control unit is utilized. According to some example embodiments, the second control signal is suitable for setting the power switch either conductive or non-conductive, for example, by taking one of two values, or, alternatively, to freely set the conductivity of the power switch. According to some example embodiments, the second control signal is generated by comparing the received sensor signal to a predefined threshold value.

According to some example embodiments, the switch control circuit is also configured to selectively transmit one of the first control signal and the second control signal to the power switch of the battery system, wherein the selection is made based on the at least one received state signal, for example,based on an operation state of the first microcontroller and based on an operation state of the second microcontroller. The first state signal may be received from the first microcontroller. The second state signal may be received from the first microcontroller and/or via the communication interface from the second microcontroller. Alternatively, the first state signal and/or the second state signal may be generated and/or received by an additional circuit component that is configured for monitoring the first and/or second microcontroller, such as, for example, a first system basis chip.

According to some example embodiments of the present invention, the switch control circuit is configured to transmit one of the first control signal and the second control signal to the power switch based on the at least one received state signal, for example, based on the operation states of the first and the second microcontroller. Therein, the switch control circuit may be configured to control the power switch by transmitting either the first control signal or the second control signal, which may both be suitable for setting the power switch to be either conductive or non-conductive. In other words, the switch control circuit of the present invention may enable two functionalities including (a) generating a second control signal additionally to that generated by the first microcontroller and (b) multiplexing the first and second control signals based on the received state signals.

According to some example embodiments, the control unit of the present invention may provide a bypass to a microcontroller commonly used for controlling a power switch for emergency shut-down of a battery system. Therein, the availability of the battery system may be improved by decreasing the FIT rate of the battery system, for example, of the protection system of the battery system, by providing an alternative signal path between a security relevant sensor value and a power switch. The control unit of the invention may therefore allow ASIL B classification of a battery system. Further, the control unit according to some example embodiments of the present invention may enable freeing of capacity of the first microcontroller in cases, where a second microcontroller connected to the control unit is in a fault state or malfunctioning. If a second state signal indicating such a fault state is received, the control unit may transfer the power switch control to the switch control circuit. Then, the first microcontroller may be used as a replacement for the second microcontroller.

According to some example embodiments, in the control unit of the invention, the switch control circuit may be configured to transmit the first control signal to the power switch, if the at least one state signal is indicative of an operability of the first microcontroller and of the second microcontroller. In other words, during a normal mode of the first microcontroller without a failure occurring therein, the first microcontroller may control the power switch of the battery system. However, the second microcontroller may also be in a normal operation such that the first control signal is transmitted to the power switch from the switch control circuit. Hence, if both, the first and the second microcontroller operate normally, all functionalities and safety mechanisms, for example, with respect to a plurality of different sensor values (temperature, current, voltage, gas composition), may be utilized for controlling the emergency shut down of the battery system via power switch.

According to some example embodiments, in the control unit of the invention, the switch control circuit may further be configured to transmit the second control signal to the power switch, if the received at least one state signal is indicative of a malfunction of the first microcontroller or the second microcontroller. In other words, if a failure occurs in the first or the second microcontroller, the control of the power switch via the first microcontroller may be stopped and the power switch may become controlled by the switch control circuit. Hence, in a fault situation of the first microcontroller, for example, determined based on the first state signal or the combined state signal, a reliable emergency shut down of the battery system may be achieved. Further, in a fault situation of the second microcontroller, for example, based on the second state signal or the combined state signal, the functions of the second microcontroller may be taken over by the first microcontroller. Therefore, capacities of the first microcontroller may be freed in that the power switch may become controlled by the switch control circuit instead of the first microcontroller. In both cases, the control of the power switch via the switch control circuit may be based on fewer sensor signals.

According to some example embodiments, the switch control circuit is configured as a hardware path. In other words, the switch control circuit may not comprise any programmable components of a certain complexity and/or integrated circuits, such as ASICs or MCUs, but may instead include more relatively simple electronic hardware components such as, for example, voltage dividers, transistors, resistors, capacitors, operational amplifiers and/or electronic hardware components with comparable functionality or formed of the aforementioned. Thus, the switch control circuit may enable relatively fast reaction and switching times with relatively high reliability. According to some example embodiments, the switch control circuit may have a FIT rate of 100 or less. According to some example embodiments, the whole hardware path between the input nodes and an output node of the control unit connected to the power switch is configured as a hardware path with a FIT rate of 100 or less. FIT rates of a hardware path may be determined based on FIT of its components.

According to some example embodiments of the control unit, the first microcontroller is configured to load the software (i.e., instructions or computer program instructions) of the second microcontroller, if the second state signal is indicative of a malfunction of the second microcontroller. Hence, the second state signal received via the first communication interface may also be provided to the first microcontroller. On receiving the second state signal indicative of a fault of the second microcontroller, the first microcontroller may load software for performing the operations usually carried out by the second microcontroller from an internal or external memory, for example, into an active memory (RAM).

According to some example embodiments, the first microcontroller is configured to perform the functions of the second microcontroller, if the second state signal is indicative of a malfunction of the second microcontroller. In other words, once the first microcontroller detects a malfunction of the second microcontroller based on the second state signal, the first microcontroller may load the software of the second microcontroller and operate as if it would be the second microcontroller. Resources for this operation may be freed by transferring power switch control to the switch control circuit. Performing the operations of the second microcontroller may include generating a first DC/DC control signal, for example, a signal suitable for controlling the DC/DC converter, for example, at least one single phase DC/DC converter of the DC/DC converter, duty cycles of switching elements of the single phase DC/DC converter, or the like. Performing the operations of the second microcontroller may further include transmitting the generated first DC/DC control signal to the DC/DC converter, for example, via a second communication interface of the DC/DC converter. Performing the operations of the second microcontroller may further include receiving required inputs for operating the DC/DC converter such as, for example, an input voltage value, a load demand signal, or the like.

According to some example embodiments, in a the control unit, the first microcontroller is configured to generate a first state signal that is based on its own operation state. In other words, the first microcontroller may perform a self-check operation, for example, in regular intervals. The results of this self-check operation, i.e., operability or malfunction, are reflected in at least one value of the first state signal. According to some example embodiments, the first microcontroller further bases the generated state signal on the received second state signal. Therein, the content of the second state signal, for example, operability of malfunction of the second microcontroller, is reflected by at least one value of the generated state signal. Such a combined state signal may be the juxtaposition of the first and second state signal, for example, with one value representing the first state signal and another value representing the other state signal. However, the first microcontroller may also generate a single value combined state signal based on the first and second state signal, for example, taking a first value if both microcontrollers function normally and a second value if one of the microcontrollers is malfunctioning. According to some example embodiments, the control unit of the present invention further comprises a first system basis chip configured to receive the first state signal and/or the second state signal.

According to some example embodiments, the first system basis chip is configured for monitoring the first microcontroller and for generating the first state signal and for transmitting it to the switch control circuit. According to some example embodiments, the first system basis chip is configured for generating a first state signal indicative of a malfunction of the first microcontroller in response to detecting a malfunction of the first microcontroller and for generating a first state signal indicative of an operability of the first microcontroller otherwise. According to some example embodiments, the first system basis chip is configured for monitoring the second state signal and to forward it to the first microcontroller and/or the switch control circuit and/or to generate a combined state signal therefrom. According to some example embodiments, the first system basis chip may be configured to perform further functions such as, for example, supervision functions, reset generators, watchdog functions, bus interface (LIN, CAN, etc.), wake-up logic, and/or power switches According to some example embodiments, the control unit further comprises a front end circuit, for example, an analog front end (AFE), that is connected to the input node and that is configured for generating a battery signal based on the sensor signal. According to some example embodiments, the battery signal is equal to one of the at least one sensor signal, which may be selected by a multiplexer. However, according to some example embodiments, the front end circuit comprises one or more of an analog amplifier, an operation amplifier, filters, and an analog to digital converter. Thus, the battery signal may be a processed signal, for example, with a relatively improved S/N ratio, relatively decreased disturbances, amplified with respect to a reference voltage (e.g., a set or predefined reference voltage or baseline voltage), or already converted to a digital signal. Any suitable front end circuit suitable for receiving different sensor signal inputs may be utilized. If a front end circuit is part of the control unit, any sensor signal may be replaced by the battery signal downstream the front end circuit.

According to some example embodiments, the control unit further comprises an amplification circuit that is interconnected between the front end circuit and the switch control circuit. Alternatively, the amplification circuit may be interconnected between the at least one input node of the control unit and the switch control circuit. According to some example embodiments, the switch control circuit is further configured to generate the second control signal based on the amplified sensor signal. According to some example embodiments, the battery signal or the sensor signal may be utilized directly for deriving the second control signal, without any further amplification necessary in the switch control circuit. Therein, amplifying the signal in the amplification circuit may enable utilizing solely hardware components without any further programmable integrated circuits downstream the amplification circuit. If the sensor signals are amplified, this embodiment may provide another bypass around the front end circuit, for example, in a case where a failure of the microcontroller is due to a cause that also influences the front end circuit such as, for example, electro-magnetic interference.

Another aspect of the invention relates to a battery system with the control unit as described above. According to some example embodiments, the battery system includes a battery cell stack that is configured to provide a first operation voltage to a first output node of the battery system. For example, the battery system may include a plurality of battery cells, which are electrically connected in parallel and/or series between a first stack node and a second stack node. Therein, the first stack node may be connected to the first output node of the battery system and the second stack node may be connected to a third output node of the battery system. The battery system further includes a power switch that is configured for selectively disconnecting the battery cell stack from the first output node. In other words, the power switch may be interconnected between the first stack node and the first output node. The control unit according to some example embodiments of the invention as described above is connected to the power switch for controlling its conductivity.

According to some example embodiments, the battery system further comprises a DC/DC converter that is configured to receive the first operation voltage as an input voltage, to perform a voltage conversion operation on the input voltage, and to output a second operation voltage to a second output node of the battery system. The DC/DC converter may include at least one single phase DC/DC converter. According to some example embodiments, the battery system may include multiple single phase DC/DC converters, and each single phase DC/DC converter may include at least two switching elements enabled to operate the single phase DC/DC converter in a push-pull-mode. According to some example embodiments, the single phase DC/DC converter is configured as a buck type push-pull DC/DC converter. The DC/DC converter may further include a second microcontroller configured for operating the DC/DC converter.

The battery system of the invention further includes a data line that is connected to the first communication interface of the control unit as described above and to a second communication interface of the DC/DC converter. The data line may provide a data communication between the control unit and the DC/DC converter, as described in more detail below. According to some example embodiments, the DC/DC converter may be configured to transmit a second state signal that is indicative of an operation state of a second microcontroller via the second communication interface, the data line, and the first communication interface to the control unit, where the second state signal may be processed as described in more detail above. The second state signal is indicative of operability or malfunction of the second microcontroller.

In a first operation mode of the battery system of the invention according to some example embodiments, the power switch is controlled by the first microcontroller and the DC/DC converter is controlled by the second microcontroller. In other words, according to some example embodiments, the control unit and the DC/DC converter operate substantially independent from each other, i.e., they do not control each other. However, also in the first operation mode, the second state signal indicative of operability of the DC/DC converter might be continuously transmitted to the control unit. Further, in a second operation mode of the battery system, the power switch may be controlled by the switch control circuit of the control unit and the DC/DC converter may be controlled by the first microcontroller via the data line. In other words, according to some example embodiments, the DC/DC converter receives a first DC/DC control signal via the data line, wherein the first DC/DC control signal is generated by the first microcontroller. Therefore, the first microcontroller may utilize functionalities that may otherwise be used for controlling the power switch.

According to some example embodiments, the first operation mode of the battery system is transferred to the second operation mode of the battery system, if a second state signal that is indicative of a malfunction of the second microcontroller is transmitted to the control unit via the data line. If the second state signal is continuously transmitted to the control unit, the second operation mode is initiated in response to a change of the signal content, for example, in response to the signal indicating a malfunction of the second microcontroller instead of its operability. Alternatively, a second state signal may be only transmitted to the control unit in case the second microcontroller is malfunctioning for transferring the battery system to the second operation mode. In other words, on the level of the battery system the change from the first to the second operation mode may only depend on the operation state of the second microcontroller.

However, as set forth above, the DC/DC converter may receive the first operation voltage of the battery system as an input voltage. Hence, if on the level of the control unit the operation of the power switch is transferred to the switch control circuit due to a fault of the first microcontroller, the DC/DC converter remains in normal operation, particularly as long as the power switch is set to be conductive. According to some example embodiments, the power switch is interconnected between the battery cell stack and the DC/DC converter. In other words, if the power switch is set to be non-conductive due to a fault of the first microcontroller, for example, after a given time constant, the DC/DC converter may also be disconnected from the battery stack and thus put into a safe state. The operation of the power switch by the switch control circuit is described in more detail below.

According to some example embodiments, the control unit is formed on a first circuit carrier such as, for example, a first printed circuit board, and the DC/DC converter is formed on a second circuit carrier such as, for example, a second printed circuit board. In other words, the control unit and the DC/DC converter may be built as standalone components, respectively. In other words, each of the control unit and the DC/DC converter may be operated without the other component. Further, the data line may provide a data connection between the first circuit carrier and the second circuit carrier. In other words, the data line may be configured to be connected to the circuit carriers and further each of the circuit carriers may include a suitable socket for connecting to the data line.

According to some example embodiments, the switch control circuit may be configured for setting the power switch to be non-conductive after a first time period after receiving at least one state signal indicating a malfunction of the first or second microcontroller. In other words, the switch control circuit may shut off the battery system from any external load after a fixed first time period lapsed because an error of the first or second microcontroller has been detected. Therein, the shut off via the power switch may occur irrespective of any other signal inputs to the switch control circuit. Thus, if the switch control circuit realizes a fault of the first microcontroller or the second microcontroller a first timer may be initiated, and after a period of time (e.g., a set or predetermined period of time), the power switch may be set to be non-conductive. This functionality may enable a relatively reliable shut down mechanism in case of failure of the first or second microcontroller and enable a low FIT rate and a high ASIL rating (e.g. ASIL B) of a control unit according to some example embodiments of the present invention. Alternatively, the switch control circuit may be configured for setting the power switch to be non-conductive after a first time period only after receiving at least one state signal indicating a malfunction of the first microcontroller, wherein receiving a state signal indicating a malfunction of the second microcontroller enables power switch control by the switch control circuit and DC/DC converter control by the first microcontroller in a prolonged manner.

According to some example embodiments, the switch control circuit is configured for generating a second control signal that causes the power switch to be set to be non-conductive if the sensor signal (the state signal) exceeds a threshold value (e.g., a set or predetermined threshold value). Therefore, according to some example embodiments, the switch control circuit may include at least one comparator circuit or operational amplifier that receives the sensor signal (the state signal) as a first input and outputs the second control signal. The threshold value (e.g., the set or predetermined threshold value)may be supplied to such comparator or operational amplifier as a second input by an external signal or from an internal memory. Hence, the switch control circuit may enable a sensor-based emergency shutdown of the power switch, for example, the battery system. Such emergency shutdown may be enabled in addition to the timer-based shutdown, for example, only during a first time period (e.g., a first set or predetermined time period).

According to some example embodiments, the switch control circuit is configured for setting the power switch conductive for a second time period after receiving at least one state signal indicating a malfunction of the first and/or second microcontroller. In other words, the switch control circuit may generate and transmit a (third) control signal for setting the power switch to be conductive to the power switch for a fixed second time period starting with the detection of an error of one of the first and/or second microcontroller. According to some example embodiments, the power switch is set to be conductive irrespective of any other signal inputs to the switch control circuit during the second time period. Thus, the sensor-based emergency shutdown of the switch control circuit may be postponed for the second time period, wherein a shut-down of the power switch is prevented. According to some example embodiments, the switch control circuit is configured for setting the power switch to be conductive for a second time period only after receiving a state signal indicating a malfunction of the first microcontroller.

Thus, some example embodiments may enable a transition phase between the first operation mode of the battery system and the second operation mode of the battery system, for example, in response to a malfunction of the second microcontroller. Also, during the first operation mode, a transition phase may be enabled between the power switch control by the first microcontroller and the power switch control by the switch control circuit. This transition phase may apply before a sensor-based emergency shutdown is realized by the switch control circuit. According to some example embodiments, the second time period is less than the FTTI of the plurality of battery cells and/or less than the first time period. Accordingly, the battery system may reach a safe state by applying the hardware-controlled sensor-based emergency shutdown by the switch control circuit within the fault tolerant time interval.

According to some example embodiments, the battery system of the present invention further comprises at least one sensor that is configured for detecting at least one of a current, a voltage, or a temperature of at least one of the plurality of battery cells as a sensor signal. In other words, the at least one sensor signal and/or the state signal is based on at least one of a voltage, a temperature, or a current of at least one of the plurality of battery cells. According to some example embodiments, the at least one sensor comprises a shunt resistor connected in series with one of the first and second node. The control unit may include two input nodes for receiving a voltage drop over the shunt as sensor signal indicative of a battery current. The two input nodes may then be connected to the front end circuit and the switch control circuit.

Another aspect of the present invention relates to a DC/DC converter for a battery system, comprising at least one single phase DC/DC converter that is configured to receive a first operation voltage provided by a battery cell stack of the battery system. In other words, the single phase DC/DC converter is connected to an input node of the DC/DC converter, the input node being connected to the first stack node of the battery cell stack. Each of the at least one single phase DC/DC converter may include at least two switching elements and may be configured as a push-pull-converter. According to some example embodiments, the at least one single phase DC/DC converter is configured as a buck-type converter. According to some example embodiments, the DC/DC converter has multiple single phase DC/DC converters operating as a multi-phase DC/DC converter.

The at least one single phase DC/DC converter may further be configured to output a second operation voltage based on the first operation voltage. The second output voltage may be output to a second output node of the battery system via an output node of the DC/DC converter. The DC/DC converter of the invention may further include a second microcontroller that is configured to operate the at least one single phase DC/DC converter. The second microcontroller may be configured to control duty cycles of switching elements of a single phase DC/DC converter or phases of a multi-phase DC/DC converter. According to some example embodiments, operating the at least one single phase DC/DC converter by the second microcontroller comprises generating and transmitting second DC/DC control signals to the single phase DC/DC converter. The second microcontroller may further detect inputs for controlling the operation of the DC/DC converter, for example, input or output voltages.

The DC/DC converter of the invention may further include a second communication interface configured to forward a second state signal indicative of an operation state of a second microcontroller. Therein, the second state signal may be generated by the second microcontroller or by another circuit element of the DC/DC converter such as, for example, a second system basis chip of the DC/DC converter. The second communication interface may be configured to be connected to a data line also connected with the first communication interface of the control unit for forwarding the second control signal to the control unit. In other words, in case of a malfunction of the second microcontroller, a second state signal indicative of this malfunction may be transmitted to the control unit via the second communication interface. Hence, the battery system may be transferred to the second operation mode as described above, for example, by carrying out the power switch control by the switch control circuit.

Further, the DC/DC converter of the invention may be configured to receive a first DC/DC control signal via the second communication interface. Therein, the first DC/DC control signal may be received from the first microcontroller performing the functions of the second microcontroller in the second operation mode of the battery system as described above. In other words, according to some example embodiments, only after the second state signal indicative of a malfunction of the second microcontroller is transmitted via the second communication interface to the control unit, the DC/DC converter may receive the first DC/DC control signal from the control unit. The DC/DC converter is further configured to operate at least one single phase DC/DC converter based on the first DC/DC control signal, for example, by bypassing the (malfunctioning) second microcontroller. Hence, the operation of the at least one single phase DC/DC converter may be resumed even if the second microcontroller is malfunctioning and thus availability of the DC/DC converter is increased.

The electronic or electric devices and/or any other relevant devices or components according to example embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g. on a PCB or another kind of circuit carrier. The conductive elements or materials may comprise metallization, for example, surface metallizations and/or pins, and/or may comprise conductive polymers or ceramics. Further electrical energy might be transmitted via wireless connections, for example, using electromagnetic radiation and/or light.

Further, the various components of these devices may be a process or thread, running on one or more processors, in one or more computing devices, executing computer program instructions and interacting with other system components for performing the various functionalities described herein. The computer program instructions may be stored in a memory which may be implemented in a computing device using a standard memory device, such as, for example, a random access memory (RAM). The computer program instructions may also be stored in other non-transitory computer readable media, for example, a CD, flash drive, or the like.

Also, a person of skill in the art should recognize that the functionality of various computing devices may be combined or integrated into a single computing device, or the functionality of a particular computing device may be distributed across one or more other computing devices without departing from the spirit and scope of the embodiments of the present invention, as defined by the claims and their equivalents.

Further aspects of the present invention are disclosed in the dependent claims or the following description of the drawings.

BRIEF DESCRIPTION OF THE DRAWINGS

Additional details and characteristics will become more apparent to those of ordinary skill in the art by describing in more detail aspects of some example embodiments with reference to the attached drawings in which.

DETAILED DESCRIPTION

Figure 1:
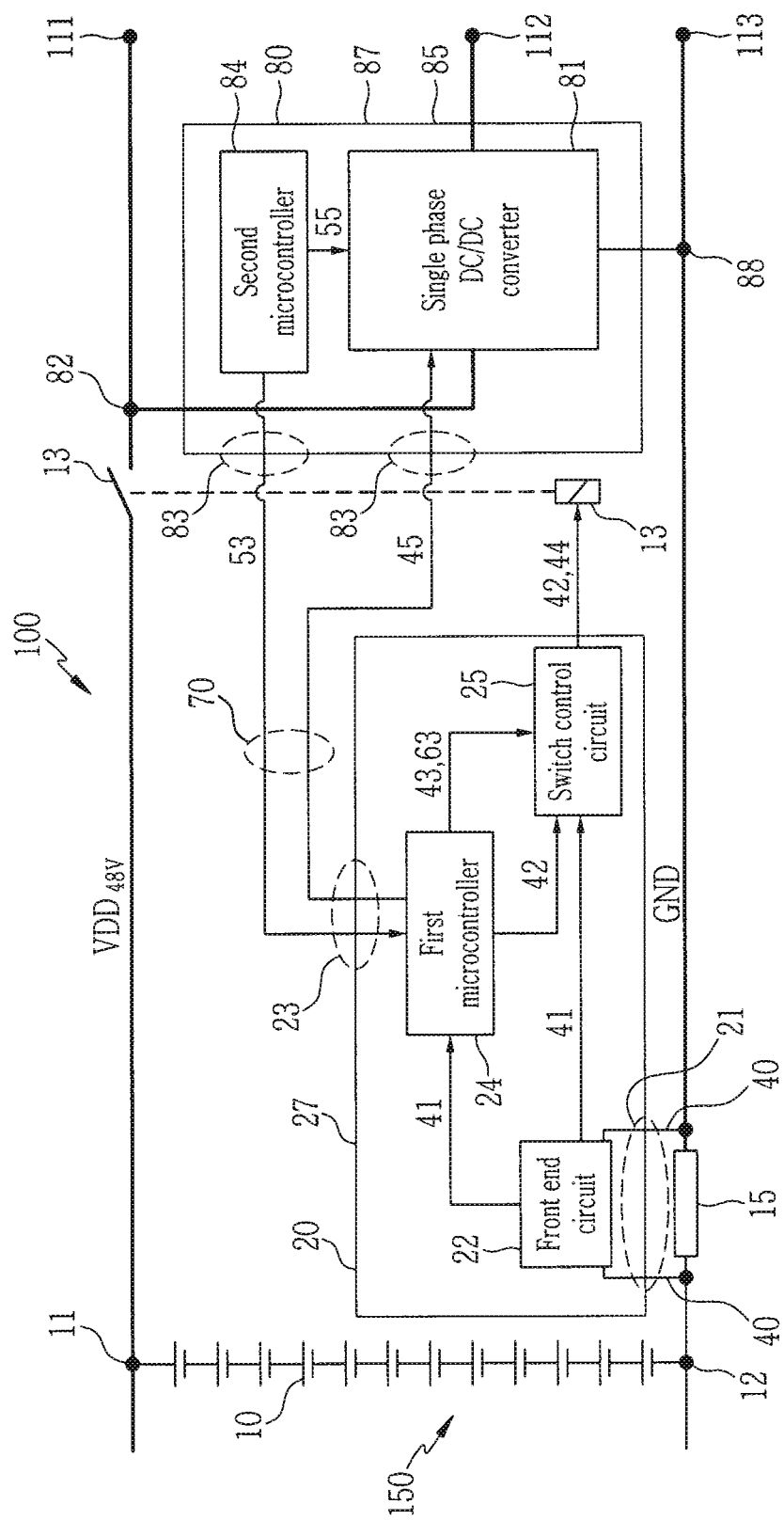
FIG. 1 illustrates a schematic circuit diagram of a battery system according to some example embodiments.

Reference will now be made in more detail to aspects of some example embodiments, which are illustrated in the accompanying drawings. Effects and features of the example embodiments, and implementation methods thereof will be described in more detail with reference to the accompanying drawings. In the drawings, like reference numerals denote like elements, and redundant descriptions are omitted. The embodiments according to the present invention, however, may be embodied in various different forms, and should not be construed as being limited to only the illustrated example embodiments herein. Rather, these embodiments are provided as examples so that this disclosure will be more thorough and more complete, and will more fully convey the aspects and features of embodiments according to the present invention to those skilled in the art.

Accordingly, processes, elements, and techniques that are not considered necessary to those having ordinary skill in the art for a complete understanding of the aspects and features of the present invention may not be described. In the drawings, the relative sizes of elements, layers, and regions may be exaggerated for clarity.

As used herein, the term "and/or" includes any and all combinations of one or more of the associated listed items. Further, the use of "may" when describing embodiments of the present invention refers to "one or more embodiments of the present invention." In the following description of embodiments of the present invention, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the spirit and scope of the present invention. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

In general, rechargeable batteries include an electrode assembly including a positive electrode, a negative electrode, and a separator interposed between the positive and negative electrodes, a case receiving or enclosing the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case (e.g., cylindrical, rectangular, etc.) may vary according to the design and use of the battery.

Rechargeable batteries may be used as a battery module formed of a plurality of unit battery cells coupled in series and/or in parallel so as to provide a relatively high energy density, for example, for motor driving of a hybrid vehicle. That is, the battery module may be formed by interconnecting the electrode terminals of the plurality of unit battery cells depending on a required amount of power and in order to realize a high-power rechargeable battery, for example, for an electric vehicle. One or more battery modules may be mechanically and electrically integrated, equipped with a thermal management system and set up for communication with one or more electrical consumers in order to form a battery system.

For meeting the dynamic power demands of various electrical consumers connected to the battery system a static control of battery power output and charging may not be sufficient. Thus, steady or intermittent exchange of information between the battery system and the controllers of the electrical consumers may be performed. This information includes the battery systems actual state of charge (SoC), potential electrical performance, charging ability and internal resistance as well as actual or predicted power demands or surpluses of the consumers.

For monitoring, controlling and/or setting of the aforementioned parameters a battery system may include a battery management unit (BMU), a battery management system (BMS), and/or a battery system manager (BSM). Each of these control units may be realized as an integrated circuit (IC), a microcontroller (pC), an application specific integrated circuit (ASIC), or the like. Control units may be an integral part of the battery system and located within a common housing or may be part of a remote control module communicating with the battery system via a suitable communication bus. In both cases, the control unit may communicate with the electrical consumers via a suitable communication bus, for example, a CAN or SPI interface.

The electric engine of an electric vehicle may be supplied by a high voltage battery system, for example, a 48 V battery system. The 48 V battery system is connected to a 48 V board net that may comprise electronic control units (ECUs) powered by the 48 V battery system. The 48 V battery system may be charged, for example, by a electric generator (combined starter generator). The electric vehicle may further comprise a 12 V board net that might be related to security relevant functions.

As an example, an ECU of a power steering system or antiskid system may be integrated in the 12 V board net. The 12 V board net may comprise a 12 V battery system, e.g. a lead-acid based battery, which may be charged by the starter generator (e.g., via a DC/DC converter (i.e., an electronic circuit configured to convert a source of direct current (DC) from one voltage level to another voltage level)).

Hence an electric vehicle according to a related art system may include a 12 V battery system, a DC/DC converter and a 48 V battery system. As these electrical systems gain more importance in the operation of such vehicle, the availability of the components of the electric system becomes more important. As an example, it shall be ensured that even if a failure occurs, for example, in the high voltage battery system or the DC/DC converter, a user should be able to operate the vehicle with limited functionality. Further, the security relevant functions as already set forth above may be designed to meet specific availability standards, such as e.g., ASIL B.

Related art systems considering these availability requirements of the electric system may focus on the availability of the high voltage battery. However, such related art systems may not consider the functional safety of the DC/DC converters under the availability aspect.

Thus, some example embodiments of the present invention may include a battery system with a DC/DC converter having relatively improved functional availability and may fulfil ASIL B. Some example embodiment may further include a control unit and a DC/DC converter for such a battery system.

FIG. 1 schematically illustrates a battery system 100 according to some example embodiments of the invention. The battery system 100 comprises a plurality of battery cells 10 forming a battery cell stack 150 interconnected between a first stack node 11 and a second stack node 12. A first operation voltage VDD, for example, 48 V, applies to the first stack node 11, while the second stack node 12 is at ground voltage level. The first stack node 11 is connected to a first output node 111 of the battery system 100 and the second stack node 12 is connected to a third output node 113 of the battery system 100. A power switch 13 is interconnected between the first stack node 11 and the first output node 111. The power switch 13 is part of a relay 13 and can be set either conductive or non-conductive based on a control signal 42, 44.

The control of the power switch 13 is carried out by the control unit 20 that is constructed as a standalone component located on a first circuit carrier 27. The control unit 20 may carry out further control operations with respect to the battery system 100 and may be configured as a battery management system, BMS, for measurement, balancing and communications.

The battery system 100 further includes a DC/DC converter 80 that may be constructed as a stand-alone component located on a second circuit carrier 87. The DC/DC converter 80 comprises a second microcontroller 84 and at least one single phase DC/DC converter 81. The latter receives the first operation voltage VDD of the battery cell stack 150 via a DC/DC input node 82 that is interconnected between the first stack node 11 and the first output node 111 and downstream of the power switch 13. The at least one single phase DC/DC converter 81 may be configured as a buck converter and may convert the input voltage to an output voltage based on a duty cycle of switching elements controlled by second microcontroller 84 via a second DC/DC control signal 55. The converted voltage is output via a DC/DC output node 85 to a second output node 112 of the battery system 100.

The DC/DC converter 80 further comprises a second communication interface 83 for transmitting and receiving signals via a data line 70. The data line 70 is also connected to a first communication interface 23 of the control unit 20, wherein the first communication interface 23 is also configured to transmit and receive signals via the data line 70.

The control unit 20 further comprises an input node 21 that is configured to receive a differential input and thus comprises two actual input nodes. These input nodes are connected upstream and downstream, respectively, of a shunt resistor 15 that is interconnected between the second stack node 12 and the third output node 113. Hence, the input node 21 receives a voltage drop over the shunt resistor 15 as a sensor signal 40.

The control unit 20 further comprises a front end circuit 22 configured to receive and process the sensor signal 40 in order to generate a battery signal 41 based on the sensor signal 40. In the present case, the battery signal 41 is indicative of a current provided by the plurality of battery cells 10 and is generated utilizing a known value of the resistance R of the shunt resistor 15.

The control unit 20 comprises a first microcontroller 24 that is connected to the front end circuit 22 and receives the battery signal 41 from the front end circuit 22. The microcontroller 24 is further configured to generate a first control signal 42 based on the battery signal 41. Therein, the first control signal 42 is suitable for setting the relay 13 to be either conductive or non-conductive. For example, the first microcontroller 24 generates a first control signal 42 that sets the relay 13 to be conductive, if the battery signal 41 is indicate of a current within the standard operation conditions of the battery system 100, and generates a first control signal 42 that sets relay 13 to be non-conductive if the battery signal 41 indicates an overcurrent.

The first microcontroller 24 further receives a second state signal 53 from the second microcontroller 84 of the DC/DC converter 80 via the first communication interface 23 of the first microcontroller 24. Therein, the second state signal 53 is indicative of the operability or a malfunction of the second microcontroller 84. The microcontroller 24 is further configured to perform a self-check procedure to determine whether or not a fault persists within the first microcontroller 24. Based on the result of this self-check procedure and the received second state signal 53, the microcontroller 24 further generates and outputs a combined state signal 63 that is indicative of an operation state of the first microcontroller 24 and the second microcontroller 84. The combined state signal 63 is either indicative of an operability of both of the first and second microcontrollers 24, 84 or is indicative of a malfunction of one of the first and second microcontroller 24, 84, for example, takes one of two possible values (e.g., "0" or "1"). Further, if no second state signal 53 is received at all or if a second state signal 53 is received that indicates an operability of the second microcontroller 84, the first microcontroller 24 may also output solely the first state signal 43 to the switch control circuit.

The control unit 20 further comprises a switch control circuit 25 that is connected to the front end circuit 22 and the microcontroller 24. The switch control circuit 25 receives the battery signal 41 as an input from the front end circuit 22. As further inputs, the switch control circuit 25 receives the first control signal 42 and the state signal 63 from the microcontroller 24.

The switch control circuit 25 is configured to generate a second control signal 44 based on the received battery signal 41. Therein, the second control signal 44 is suitable for setting the relay 13 to be either conductive or non-conductive. The switch control circuit 25 generates a second control signal 44 that sets the relay 13 to be conductive if the battery signal 41 indicates a current within standard operation conditions of the battery system 100 and generates a second control signal 44 that sets relay 13 to be non-conductive if the battery signal 41 indicates overcurrent. Therein, the overcurrent may differ from that of the first control signal 42.

The switch control circuit 25 outputs either the first control signal 42 or the second control signal 44 to the relay 13. The switch control circuit 25 puts one of these signals 42, 44 through to the power switch 13 based on the state signal 63. In other words, based on (or according to) the value of the state signal 63, that is whether it is indicative of operability of both of the microcontrollers 24, 84 or a malfunction of one of the microcontrollers 24, 84, the switch control circuit 25 selects one of the first and second control signal 42, 44 and outputs the selected control signal to relay 13.

Thus, the control unit 20 allows for continued control of relay 13 based on sensor signal 40 if the first microcontroller 24 has a malfunction and can no longer reliably control the relay 13 in order to improve availability of control unit 20. Further, the control unit allows for controlling relay 13 via switch control circuit 25 if the second microcontroller 84 has a malfunction, thus freeing capacities of the first microcontroller 24.

For example, in response to receiving a second state signal 53 indicating a malfunction of the second microcontroller 84, the first microcontroller 24 is not only configured to change the value of the combined state signal 63 in order to activate relay 13 control via the switch control circuit 25. Additionally, on receiving a second state signal 53 indicating a malfunction of second microcontroller 84, the first microcontroller 24 further loads software (i.e., instructions or computer program instructions) of the second microcontroller 84 from a memory and starts to perform the operations of the second microcontroller 84. For example, the first microcontroller generates at least one first DC/DC control signal 45 and transmits it via the first communication interface 23, the data line 70, and the second communication interface 83 to the at least one single phase DC/DC converter 81 for controlling the single phase DC/DC converter 81. Hence, the first microcontroller 24 is further configured to improve availability of DC/DC converter 80 in response to a malfunction of the second microcontroller 84.

Figure 2:
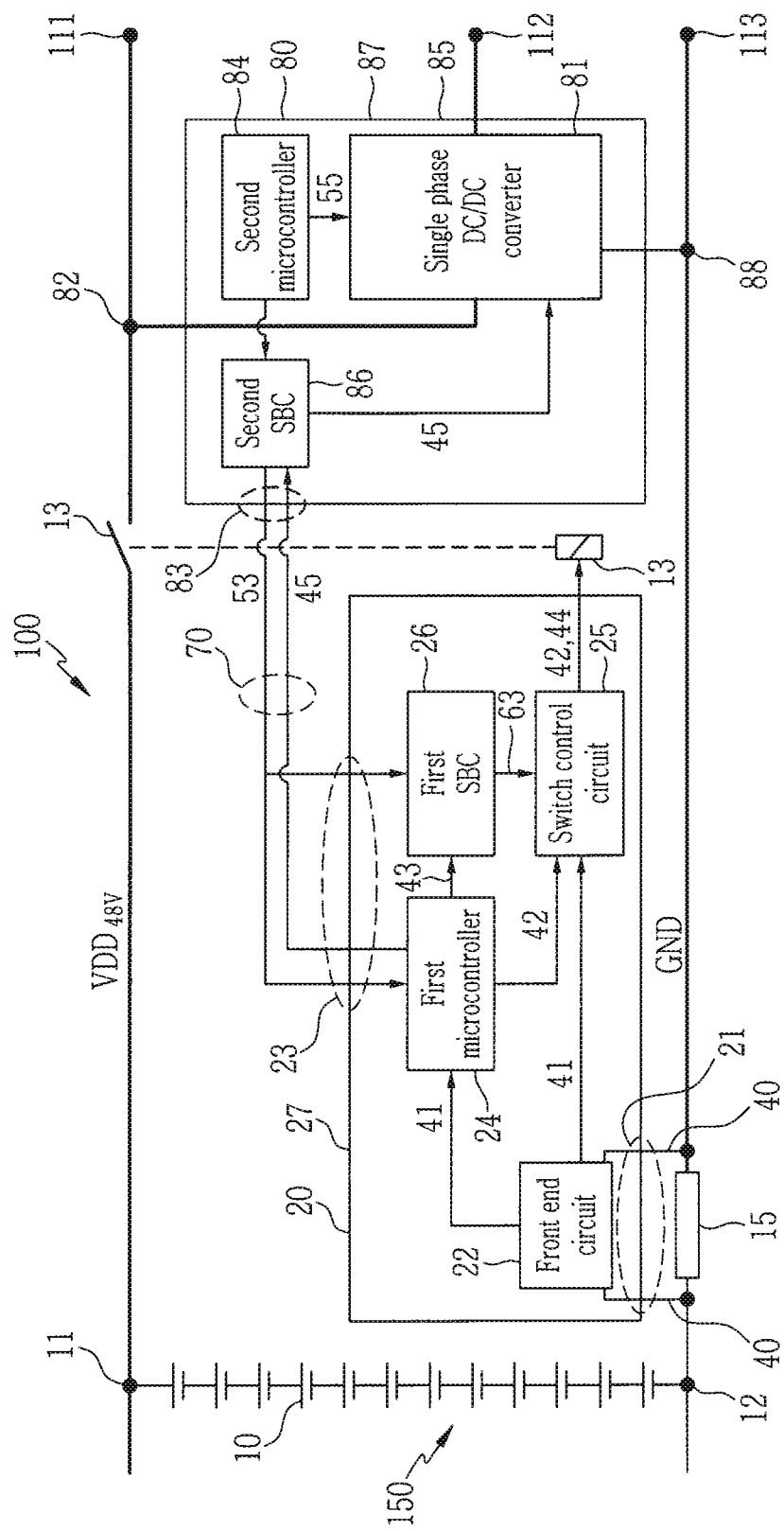
FIG. 2 illustrates a schematic circuit diagram of a battery system according to some example embodiments.

FIG. 2 illustrates a schematic circuit diagram of a battery system 100 according to some example embodiments. Therein, the same elements are denoted by same reference signs and some repeated description may be omitted. The battery system of FIG. 2 differs from that of FIG. 1 in that the DC/DC controller 80 comprises a second system basis chip 86 that is configured to check the operation state of the second microcontroller 84 and to generate and transmit a second state signal 53 indicative of a malfunction of second microcontroller 84 in case of such malfunction. The second SBC 86 is further configured to receive the first DC/DC control signal 45 and to forward the first DC/DC control signal 45 to the single phase DC/DC converter 81.

The battery system 100 further differs from that of FIG. 1 in that the control unit 20 comprises a first system basis chip 26. The first SBC 26 is configured to receive the first state signal 43 from the first microcontroller 24 and the second state signal 53 of the second microcontroller 84 and to generate a combined state signal 63 as described above. The first SBC 26 is further configured to transmit the combined signal 63 to switch control circuit 25.

Figure 3:
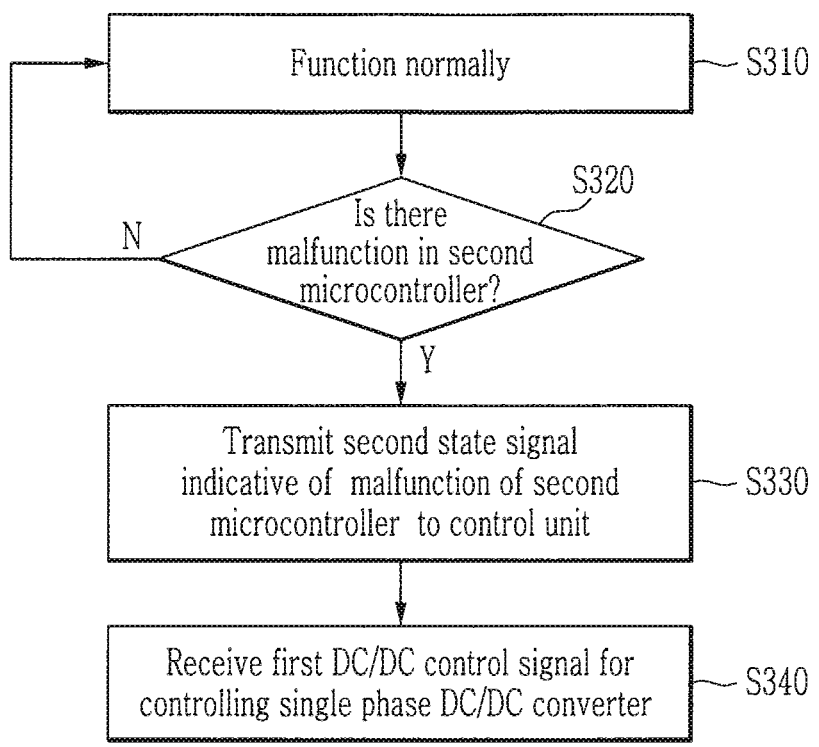
FIG. 3 schematically illustrates the operation of a DC/DC converter according to some example embodiments.

FIG. 3 is a flow diagram illustrating various operation steps of a DC/DC converter 80 according to some example embodiments of the invention. During operation S310, the DC/DC converter 80 functions normally, for example, without a fault of any component. The battery system 100 is thus in the second operation mode. In operation S320 it is checked whether a malfunction of the second microcontroller 84 is present. If this determination is negative, normal operation S310 is continued. If the determination in S320 is positive, the operation proceeds to operation S330, wherein a second state signal 53 indicative of the malfunction of the second microcontroller 84 is transmitted via second communication interface 83 and data line 70 to control unit 20. Subsequently to operation S330, at operation S340, a first DC/DC control signal 45 is received via data line 70 and second communication interface 83 for controlling the single phase DC/DC converter 81.

Figure 4:
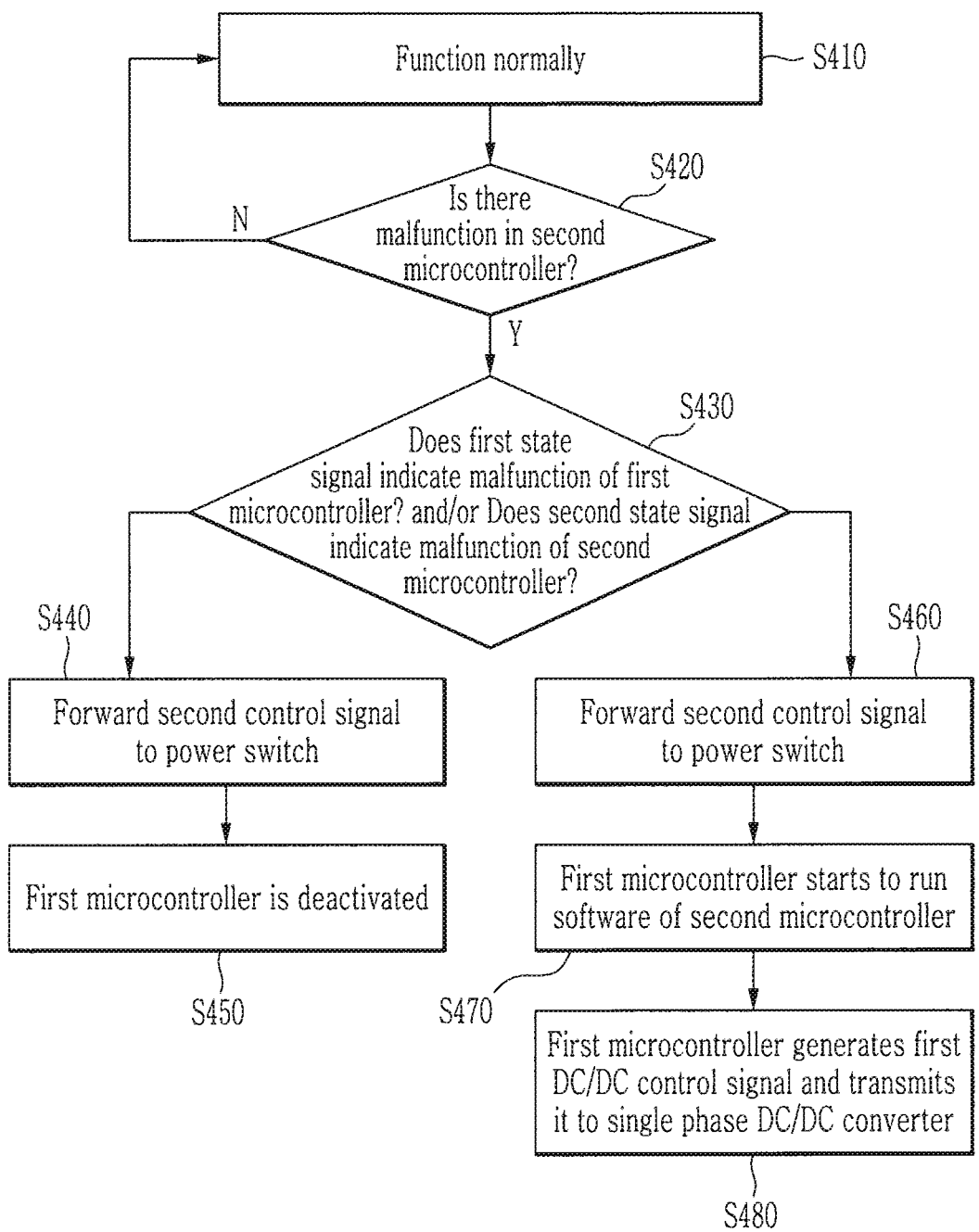
FIG. 4 schematically illustrates the operation of a control unit according to some example embodiments.

FIG. 4 is a flow diagram illustrating various operation steps of a control unit 20 according to some example embodiments of the invention. During operation 410, the control unit 20 functions normally, for example, without a fault of any component. The battery system 100 is thus in the second operation mode. In operation S420 it is checked whether or not a state signal 43, 53 indicative of a malfunction is present at the control unit 20. If this determination is negative, normal operation S410 is continued. If the determination in S420 is positive, it is then determined in operation S430 whether or not the first state signal 43 indicates a malfunction of the first microcontroller 24 and/or whether or not the second state signal 53 indicates a malfunction of the second microcontroller 84.

If the first state signal 43 indicates a malfunction of the first microcontroller 24, the operation always proceeds with operation S440, irrespective of the state of second microcontroller 84. In operation S440, the control of power switch 13 is transferred to the second control signal 44. In other words, switch control signal 25 starts to forward the second control signal 44 instead of the first control signal 42 to the power switch 13. Hence, the fault of the first microcontroller 24 cannot negatively impact the operation of the power switch 13. In operation S450, the first microcontroller 24 is deactivated as described in more detail with respect to FIG. 7.

If the second state signal 83 indicates a malfunction of the second microcontroller 84, the operation proceeds with operation S460, if there is no malfunction of the first microcontroller 24. Also in operation S460, the control of power switch 13 is transferred to the second control signal 44. In other words, switch control signal 25 starts to forward the second control signal 44 instead of the first control signal 42 to the power switch 13. Hence, capacities of the first microcontroller 24 previously used to generate first control signal 42 are freed. In operation S470 the software of the second microcontroller 84 is loaded from an internal or external memory and the first microcontroller 24 starts to run the software of the second microcontroller 84. For example, the first microcontroller 24 generates a first DC/DC control signal 45 in step S480 and transmits it via the interfaces 23, 83 and data line 70 to single phase DC/DC converter 81.

Figure 5:
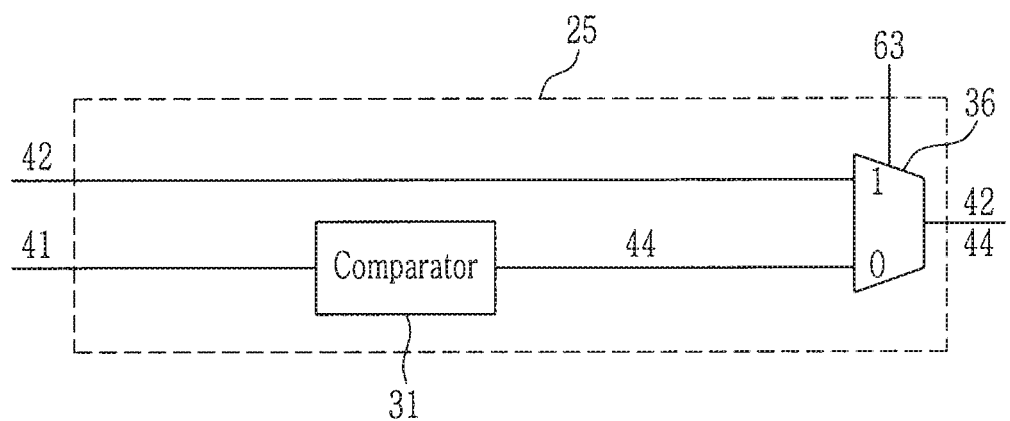
FIG. 5 illustrates a schematic view of a switch control circuit according to some example embodiments.

FIG. 5 illustrates a schematic view of a switch control circuit 25 according to some example embodiments. The switch control circuit 25 of this embodiment comprises a multiplexer 36 and a comparator 31. The comparator 31 is configured to compare the battery signal 41 with a threshold value (e.g., a set or predetermined threshold value). Therein, the comparator 31 may comprise a further input for receiving the threshold value (e.g., the set or predetermined threshold value). The comparator 31 outputs a second control signal 44 that reflects whether or not the battery signal 41 exceeds the threshold value (e.g., the set or predetermined threshold value) or not. The multiplexer 36 comprises two data signal inputs and one control signal input. The first control signal 42 is supplied to a first data signal input and the output of comparator 31 is supplied to the second data signal output. A combined state signal 63 as described above and generated by first microcontroller 24 of first system basis chip 26 is supplied to the control signal input. The multiplexer 36 outputs one of the first and second control signal 42, 44 based on the value of the received combined state signal 63.

Figure 6:
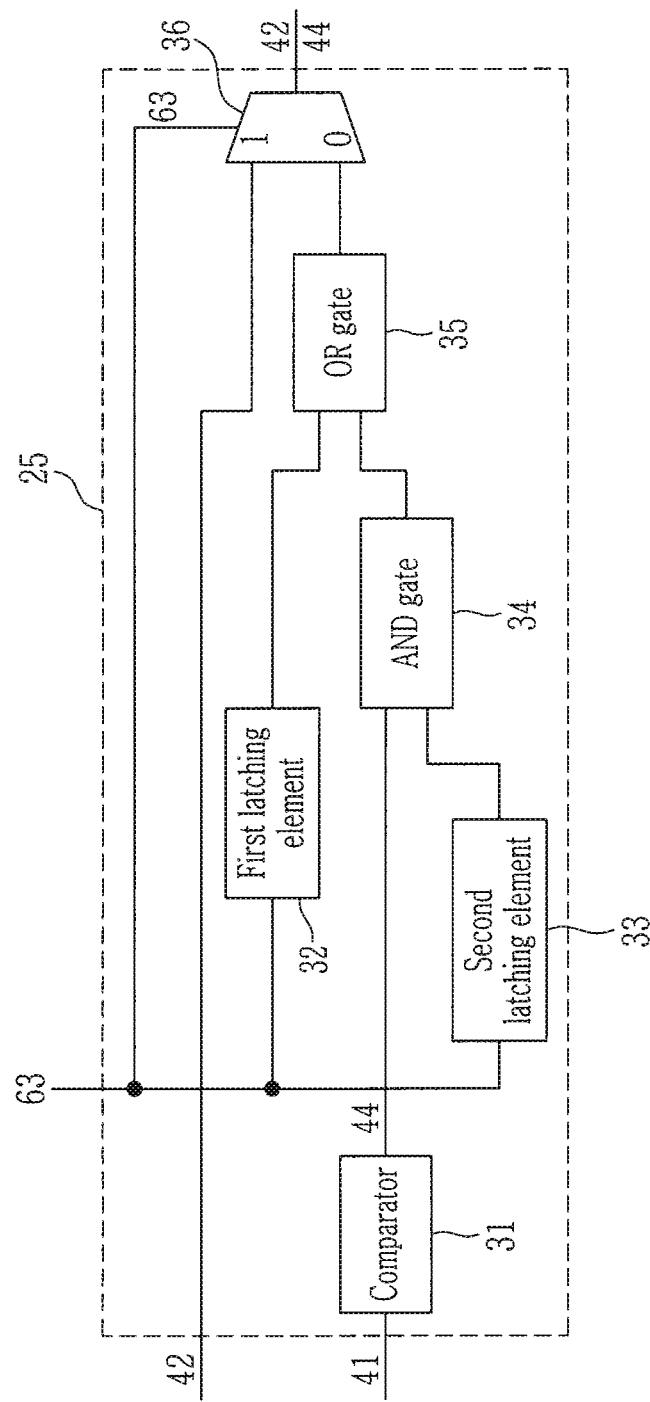
FIG. 6 illustrates a schematic view of a switch control circuit according to some example embodiments.

FIG. 6 illustrates an operation of a switch control circuit 25 according to some example embodiments. The switch control circuit 25 of this embodiment realizes the functionalities of the battery system and provides further functionalities related to a first time period and a second time period as described above and with reference to the timeline of FIG. 7.

The switch control circuit 25 of FIG. 6 receives as inputs the battery signal 41, the first control signal 42 and the combined state signal 63. During a normal operation mode A (see FIG. 7) of the battery system 100, the first microcontroller 24 operates without fault and a maximum current $I'_{max}$ is allowed to be provided by the battery system 100. During operation mode A, combined state signal 63 is indicative of the operability of first microcontroller 24 and of second microcontroller 84 and takes the binary value "1". The combined state signal 63 is supplied to the multiplexer 36 as control signal input and sets the signal output of multiplexer 36 to the first data signal input 1 to which the first control signal 42 is supplied from the first microcontroller 24. Hence, during normal operation mode A, the first control signal 42 is output to the relay 13 via multiplexer 36 and thus the relay 13 is controlled by first microcontroller 24. For example, the first microcontroller 24 sets the relay 13 non-conductive via the first control signal 42 if the battery signal 41 indicates a current that exceeds $I'_{max}$.

Figure 7:
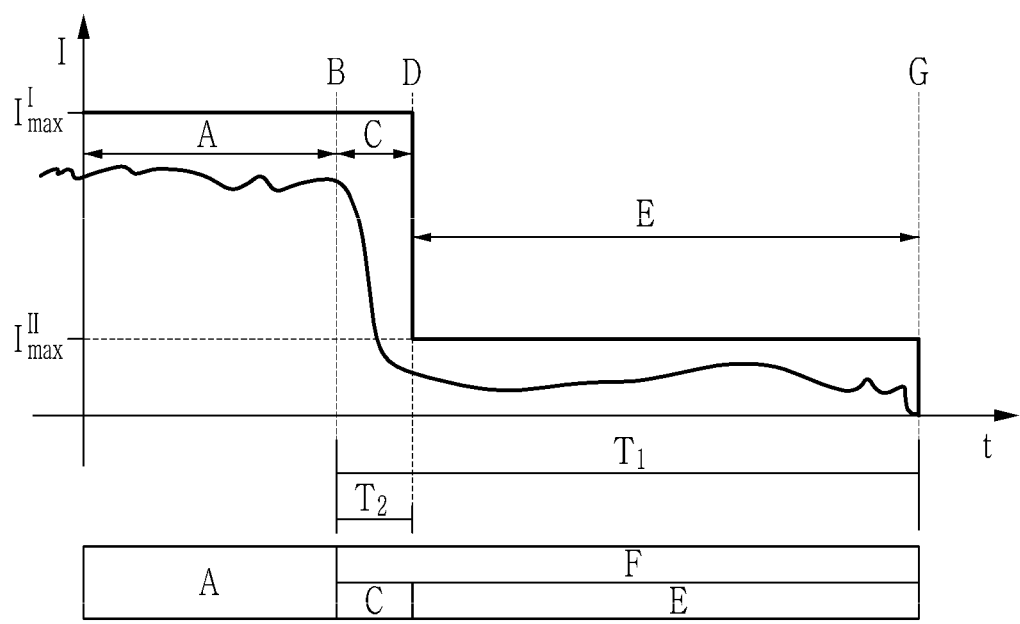
FIG. 7 illustrates a timeline of a current of a battery system according to some example embodiments.

At time point B shown in FIG. 7, a failure occurs in the first microcontroller 24 and is immediately realized by the first microcontroller 24 itself (FIG. 1) or by first SBC 26 connected to the first microcontroller 24 (FIG. 2). Alternatively, a failure occurs in second microcontroller 84 and is either realized by the second microcontroller 84 itself or by second SBC 86. Hence, from time point B the combined state signal 63 is indicative of a malfunction of the first or second microcontroller 24, 84 by taking the value "0". Thus, the control signal input of the multiplexer 36 is set to the second data signal input 0 via the state signal 63.

Further, at time point B at least one second electrical consumer or component of an electric vehicle that is supplied by the battery system 100 and is not security relevant for the vehicle is disconnected from the battery system 100 via a control unit that might be the system basis chip 26 of FIG. 2. Hence, as shown in FIG. 7, the current I (curved line) starts dropping from the time point B in order to increase safety of the vehicle.

The second data signal input 0 of multiplexer 36 is connected to the battery signal 41 by a hardware path described in more detail below. At least with respect to the embodiment of the control unit 20 as illustrated in FIGS. 1 and 2, the relay 13 is set conductive as long as it receives a high signal "1".

As a part of said hardware path, the second data signal input of multiplexer 36 is connected to the state signal 63 via an OR gate 35 and a first latching element 32. Therein, the first latching element 32 receives state signal 63 as an input and transmits an output to OR gate 35. The first latching element 32 latches a high input signal supplied thereto for a second time period (e.g., a set or predetermined second time period) $T_2$. As the value of the state signal 63 changes from high to low at time point B of FIG. 7, the first latching element 32 outputs a high value "1" to a first input of OR gate 35 until the second time period $T_2$, which started at time point B, lapses. The OR gate 35 outputs a high value "1" as long as a single input provided thereto is high and thus provides a high signal "1" to the second date signal input 0 of the multiplexer 36 until the second time period $T_2$, started at time point B, lapses.

As illustrated in FIG. 7 during the second time period $T_2$, that is, during initial mode C, the current drops below a second current threshold $I''_{max}$ due to cutting not security relevant second electrical consumers from the battery system 100. During initial mode, no threshold based control of relay 13 occurs in order to allow reducing the current consumption below $I^H_{max}$ while preventing a premature shut down of the battery system 100 via the relay 13.

After lapse of the second time period $T_2$, which started at time point B, the first latching element 32 does not longer provide a high signal "1" to the first input of OR gate 35. Thus, whether or not the OR gate 35 outputs a high signal to multiplexer 36 solely depends on the signal applied to a second input of the OR gate 35. The second input of the OR gate 35 receives an output signal of an AND gate 34, the inputs of which are described in more detail below.

A second input of the AND gate 34 is connected to the state signal 63 via a second latching element 33. The second latching element 33 latches a high input signal supplied thereto for a first time period (e.g., a set predetermined first time period) $T_1$. As the value of the state signal 63 changes from high to low at time point B of FIG. 7, the second latching element 33 outputs a high value "1" until the lapse of first time period $T_1$, which started at time point B. Thus, at the end of the first time period $T_1$, that is, at point G illustrated in FIG. 7, the second latching element 33 outputs a low signal "0" to AND gate 34 that thus also outputs a low signal "0" to multiplexer 36. Hence, at point G the availability mode of the battery system 100 that started with a malfunction at point B ends and the battery system 100 is inevitably shut down by setting relay 13 to be non conductive.

A first input of the AND gate 34 is connected to a comparator 31 as already described with respect to FIG. 5 that receives the battery signal 41 and outputs a second control signal 44 based on a comparison between this signal 41 and a predetermined threshold. Therein, the comparator 31 outputs a high signal "1" if the battery signal 41 indicates a current below threshold current $I^H_{max}$ as illustrated in FIG. 7 and outputs a low signal "0" if the battery signal 41 indicates a current above threshold current $I^H_{max}$ as illustrated in FIG. 7.

Hence, during the first time period $T_1$ and after the lapse of the second time period $T_2$, that is, between the points D and G or during low performance mode E as illustrated in FIG. 7, a sensor-based control of the relay 13 is performed in order to realize an overcurrent protection, whereas the overcurrent is lowered from $I^I_{max}$ to $I^H_{max}$. In other words, during the low performance mode E, the battery system 100 is shut down via relay 13 if the state signal 41 (or the amplified sensor signal 41') indicates a current above threshold current $I^H_{max}$. In case the state signal 63 ("0") is indicative of a malfunction of the second microcontroller 84, the first microcontroller can control the operations of the DC/DC converter during the first time period $T_1$, eventually during loading and executing the software of μC2 during $T_2$.

SOME OF THE REFERENCE NUMERALS AND SYMBOLS 10 battery cell
11 first stack node
12 second stack node
13 power switch (relay)
15 sensor (shunt resistor)
20 control unit
21 input node
22 front end circuit
23 first communication interface
24 first microcontroller
25 switch control circuit
26 first system basis chip
27 first circuit carrier
31 comparator circuit
32 first latching element
33 second latching element
34 "AND" gate
35 "OR" gate
36 multiplexer
40 sensor signal
41 battery signal
42 first control signal
43 first state signal
44 second control signal
45 first DC/DC control signal
53 second state signal
55 second DC/DC control signal
63 combined state signal
70 data line
80 DC/DC converter
81 single phase DC/DC converter
82 DC/DC input node
83 second communication interface
84 second microcontroller
85 DC/DC output node
86 second system basis chip
87 second circuit carrier
88 DC/DC ground node
100 battery system
111 first output node
112 second output node
113 ground node
150 battery cell stack

What is claimed is:

1. A control unit for a battery system, the control unit comprising:
   a first microcontroller configured to receive a signal indicative of a state of at least one battery cell of the battery system, to generate a first control signal suitable for controlling a power switch based on the signal indicative of the state of the at least one battery cell, and to generate a combined state signal based on its own operation state and based on a received second state signal, wherein the combined state signal comprises data indicative of at least one of an operability of both the first microcontroller and a second microcontroller or a data indicative a malfunction of the first microcontroller or the second microcontroller;
   a first communication interface configured to receive the second state signal indicating an operation state of the second microcontroller; and
   a switch control circuit external with respect to the first microcontroller and configured to:
      receive the first control signal from the first microcontroller;
      receive, as an input to the switch control circuit, the signal indicative of the state of the at least one battery cell;
      generate a second control signal suitable for controlling the power switch based on the signal indicative of the state of the at least one battery cell; and
      selectively transmit one of the first and second control signals to the power switch of the battery system based on a value of the combined state signal indicating an operation state of the first microcontroller and of an operation state of the second microcontroller.

2. The control unit of claim 1, wherein the switch control circuit is further configured to:
transmit the first control signal to the power switch, in response to the at least one state signal indicating an operability of the first and second microcontrollers; and
transmit the second control signal to the power switch, in response to the at least one state signal indicating a malfunction of the first or second microcontroller.

3. The control unit of claim 1, wherein the first microcontroller is configured to load instructions of the second microcontroller, in response to the second state signal indicating a malfunction of the second microcontroller.

4. The control unit of claim 3, wherein the first microcontroller is further configured to perform functions of the second microcontroller, in response to the second state signal indicating a malfunction of the second microcontroller.

5. The control unit of claim 1, wherein the first microcontroller is configured to:
generate a first state signal based on its own operation state.

6. The control unit of claim 1, further comprising a system basis chip configured to:
receive a first state signal indicating an operation state of at least the first microcontroller and/or the second state signal; and
transmit a combined state signal to the switch control circuit.

7. A battery system, comprising:
a battery cell stack configured to provide a first operation voltage to a first output node;
a power switch configured to selectively disconnecting the battery cell stack from the first output node;
a DC/DC converter configured to receive the first operation voltage as an input voltage and to output a second operation voltage to a second output node;
the control unit of claim 1; and
a data line connected to the first communication interface of the control unit and a second communication interface of the DC/DC converter,
wherein the DC/DC converter is configured to transmit the second state signal indicating the operation state of the second microcontroller of the DC/DC converter via the second communication interface.

8. The battery system of claim 7, wherein in a first operation mode of the battery system, the power switch is controlled by the first microcontroller and the DC/DC converter is controlled by the second microcontroller, and wherein in a second operation mode of the power switch is controlled by the switch control circuit and the DC/DC converter is controlled by the first microcontroller via the data line.

9. The battery system of claim 8, wherein the first operation mode is transferred to the second operation mode, in response to the second state signal indicating a malfunction of the second microcontroller is transmitted to the control unit via the data line.

10. The battery system of claim 7, wherein the power switch is interconnected between the battery cell stack and the DC/DC converter.

11. The battery system of claim 7, wherein the control unit is formed on a first circuit carrier, the DC/DC converter is formed on a second circuit carrier and the data line provides a data connection between the first circuit carrier and the second circuit carrier.

12. The battery system of claim 7, wherein the DC/DC converter comprising:
at least one single phase DC/DC converter configured to receive a first operation voltage provided by a battery cell stack of the battery system and to output a second operation voltage;
the second microcontroller configured to operate the at least one single phase DC/DC converter; and
the second communication interface configured to forward the second state signal indicating the operation state of the second microcontroller.

13. The battery system of claim 12, further configured to receive a first DC/DC control signal via the second communication interface and to operate at least one single phase DC/DC converter based on the first DC/DC control signal.

14. The battery system of claim 12, wherein at least one single phase DC/DC converter comprises at least two switching elements and wherein operating the single phase DC/DC converter comprises setting duty cycles of the at least two switching elements.

15. The battery system of claim 12, further comprising a system basis chip configured to detect a malfunction of the second microcontroller and to transmit the second state signal via the second communication interface.

* * * * *